No. 787,491. PATENTED APR. 18, 1905.
C. A. BRACKELSBERG.
TIRE.
APPLICATION FILED FEB. 29, 1904.
2 SHEETS—SHEET 1.
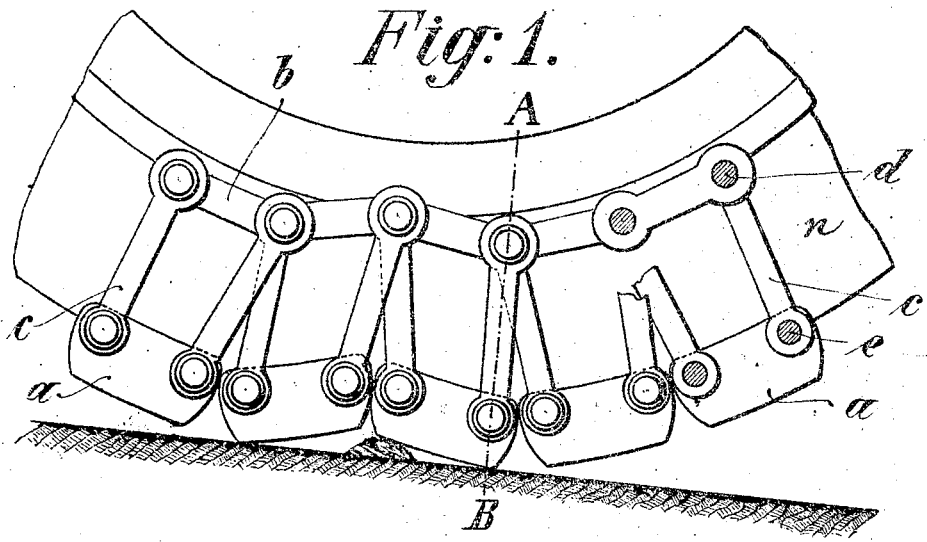
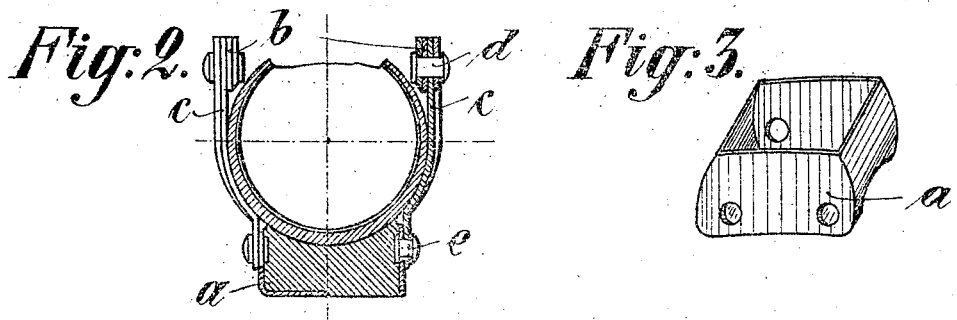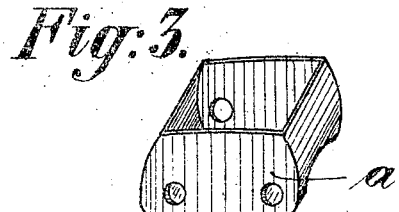
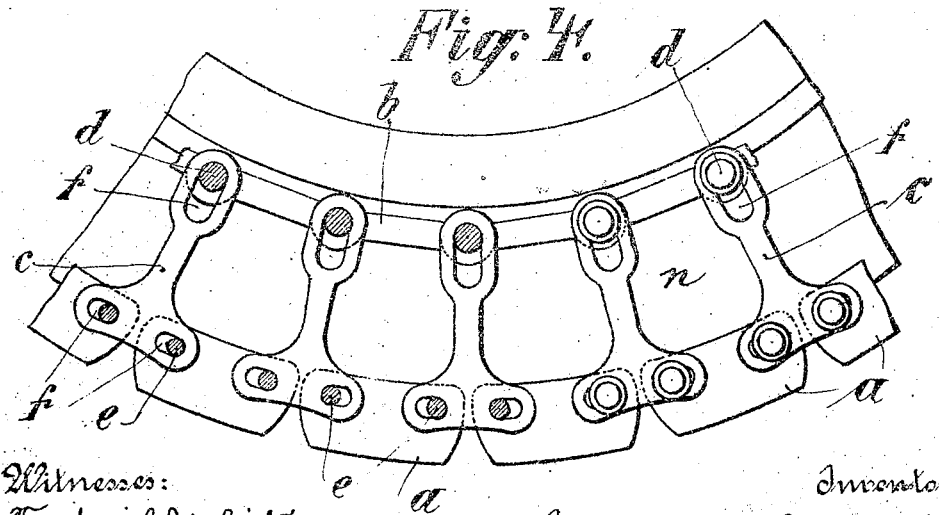
Witnesses:
Frederick Unfricht
William Schulz
Inventor
Carl Adolf Brackelsberg

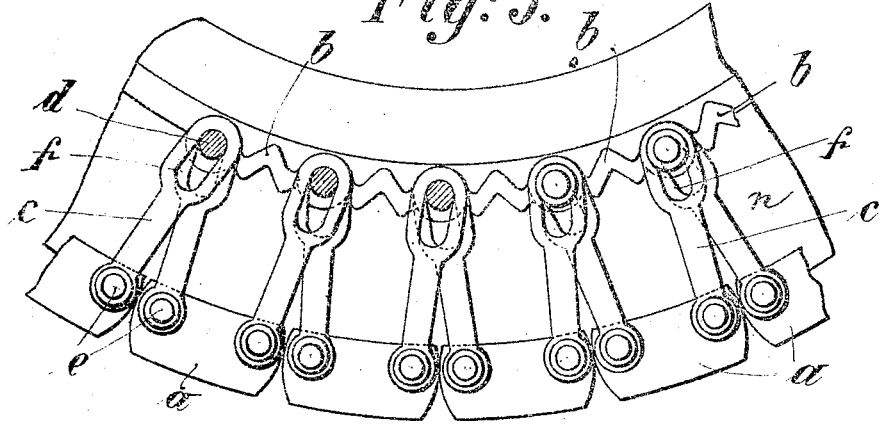
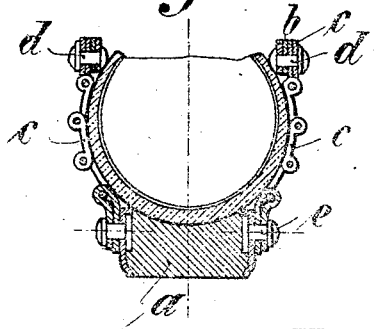
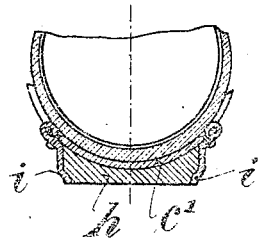
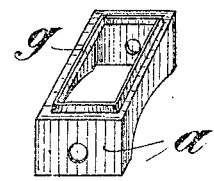
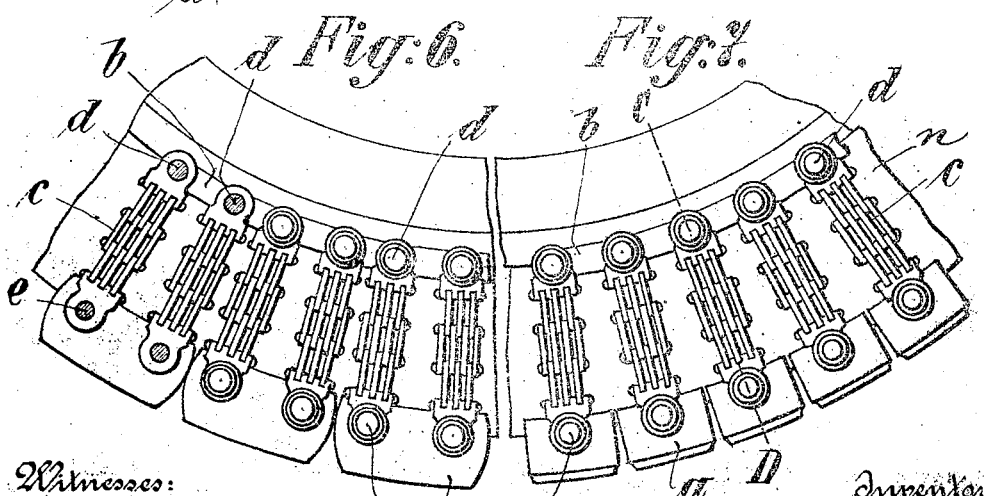

No. 787,491. Patented April 18, 1905.

UNITED STATES PATENT OFFICE.

CARL ADOLF BRACKELSBERG, OF DÜSSELDORF, GERMANY.

TIRE.

SPECIFICATION forming part of Letters Patent No. 787,491, dated April 18, 1905.

Application filed February 29, 1904. Serial No. 195,763.

*To all whom it may concern:*

Be it known that I, CARL ADOLF BRACKELSBERG, a subject of the German Emperor, residing at Düsseldorf, Germany, have invented new and useful Improvements in Tires, of which the following is a specification.

My invention relates to a yielding flexible tire inclosing and protecting the pneumatic tire of a wheel from injury and preventing a sliding of the wheels on the ground, so frequently occurring with pneumatic tires.

My invention is illustrated on the drawings therewith, in which—

Figure 1 shows a portion of my new tire; Fig. 2, a cross-section through the same on line A B, Fig. 1; and Fig. 3, a metal casing covering the segments hereinafter described. Figs. 4 to 10 illustrate modifications herein described of the invention.

To a pair of parallel closed rings or rims consisting of links $b$, flexibly joined to each other by pivots $d$, there are attached, by means of curved levers or arms $c$, also turnable on pivots $e$, segments or shoes $a$. The links $b$ thus form two endless chains arranged at opposite sides of the flexible tire $n$, while the shoes $a$ engage the tread of the tire. The result of this arrangement is a tire which although its outside surface is closed can be bent in the direction toward the center, the segments $a$ and levers $c$ turning on their pivots $d$ and $e$. The said segments consist each of a metal casing, as shown by Fig. 3, which may be filled out by wood, india-rubber, paper, or any other material, or the said material may be secured and protected by a ferrule $g$, as shown by Fig. 10, which would particularly prohibit a sliding of the wheel, as the sharp edges of the ferrule would enter into the ground. The tread may be given any desired profile. The flexibility of the said segmental pieces $a$ depends upon the shape of the links $c$, for the bending curve of the links $b$ is bound to certain limits and is somewhat exaggerated on the drawings. As the rims formed by the said links $b$ are strained by the pressure of the pneumatic tire against the segmental pieces $a$, a yielding of the rims can only take place by overcoming the aggregate force exerted against the said pieces $a$, because a strong bending would involve a reduction of the said rims formed by the said pieces $b$. Consequently the elasticity would be hardly perceptible by making the levers $c$ absolutely rigid. For this reason I prefer to make the said levers $c$ of a flexible or elastic material or give them a form which permits them to yield independently of any movement of the said rims $b$. I accomplish this by the construction shown in Fig. 4, where the segmental pieces $a$ are connected by the broad bottom ends of the pieces $c$, while the upper end connects them with the rims $b$, so that when the latter should break the pieces $a$ would still form a closed hoop unable to go off. A slot $f$, provided in each upper end of the links $c$, obviates a transfer of the movement of the pieces $a$ toward the center of the wheel. The pieces can only be made to yield if not less than two pieces are moving; but the construction shown by Fig. 5, where the connection corresponds with that shown in Fig. 1, except that the upper end is slotted like in Fig. 4, permits each segmental piece $a$ to move independently. As in these constructions the levers or links $c$ are sliding upon the pneumatic tire and are apt to gradually wear out the latter, I provide another form for the said links $c$—viz., flat chains, as shown by Figs. 6, 7, and 8. In Fig. 6 each segment $a$ is connected by two such chains with the rim $b$, while in Fig. 7 each segment is smaller and connected with the said rim $b$ by one chain only. The said chain connections will yield when the segments $a$ move and will adapt themselves to the form of the pneumatic tire.

To obtain an uninterrupted continuous tread, a flexible hoop or band $h$ may be inserted in the links $c$ and held by projecting parts $i$.

The object of the aforesaid linked rims $b$ being to permit the laying of the protective tire round any wheel, it may be replaced by an ordinary felly.

What I claim as my invention, and desire to protect by Letters Patent, is—

1. On a wheel a yielding flexible tire consisting of two parallel closed rims composed of links jointed to each other by pivots, and segmental pieces forming the tread of the wheel and being connected with the aforesaid rims by pivoted curved levers or links, substantially as described.

2. On a wheel a yielding flexible tire consisting of two parallel closed rims composed of links jointed to each other by pivots, and segmental pieces forming the tread of the wheel and being connected with the aforesaid rims by pivoted curved levers or links, slotted at the upper end, substantially as described and for the purposes set forth.

3. The combination of a flexible tire with a pair of linked endless chains arranged at opposite sides thereof, arms pivoted to the chain-links, and shoes pivoted to the arms and engaging the tread of the tire, substantially as specified.

4. The combination of a flexible tire with a pair of linked endless chains arranged at opposite sides thereof, shoes engaging the tread of the tire, and arms that yieldingly connect the chains to the shoes, substantially as specified.

Signed by me at Düsseldorf, Germany, this 1st day of February, 1904.

CARL ADOLF BRACKELSBERG.

Witnesses:
 WILLIAM ESSENWEIN,
 ERNST VÖLCKERS.